United States Patent
Ugaji et al.

(10) Patent No.: US 7,514,181 B2
(45) Date of Patent: Apr. 7, 2009

(54) SOLID ELECTROLYTE AND ALL SOLID STATE BATTERY CONTAINING SAME

(75) Inventors: Masaya Ugaji, Suita (JP); Shinji Mino, Ibaraki (JP); Yasuyuki Shibano, Sakai (JP); Shuji Ito, Nara (JP)

(73) Assignee: Panasonic Corporation, Osaka (JP)

(*) Notice: Subject to any disclaimer, the term of this patent is extended or adjusted under 35 U.S.C. 154(b) by 675 days.

(21) Appl. No.: 10/551,935

(22) PCT Filed: Apr. 15, 2004

(86) PCT No.: PCT/JP2004/005424

§ 371 (c)(1),
(2), (4) Date: Oct. 4, 2005

(87) PCT Pub. No.: WO2004/093236

PCT Pub. Date: Oct. 28, 2004

(65) Prior Publication Data

US 2006/0216611 A1  Sep. 28, 2006

(30) Foreign Application Priority Data

Apr. 18, 2003 (JP) .............. 2003-113850

(51) Int. Cl.
*H01M 6/18* (2006.01)
*H01G 9/025* (2006.01)

(52) U.S. Cl. .............. 429/322; 429/304; 429/321; 252/62.2

(58) Field of Classification Search .............. 429/322
See application file for complete search history.

(56) References Cited

U.S. PATENT DOCUMENTS 5,597,660 A  1/1997  Bates et al.

FOREIGN PATENT DOCUMENTS

| EP | 1 094 532 A1 | 4/2001 |
|---|---|---|
| JP | 2-225310 A | 9/1990 |
| JP | 3-29206 A | 2/1991 |
| JP | 4-162306 A | 6/1991 |
| JP | 3-246868 A | 11/1991 |
| JP | 5-299101 A | 11/1993 |
| JP | 10-312789 | 11/1998 |
| JP | 11-007942 A | 1/1999 |

(Continued)

OTHER PUBLICATIONS

European Search Report issued in European Patent Application No. EP 04 72 7754, mailed Jun. 14, 2007.
Rissouli, K., et al., "Electrical Conductivity in Lithium Orthophosphates", Materials Science & Engineering B, 2003, pp. 185-189, vol. 98, Elsevier.

*Primary Examiner*—Dah-Wei D Yuan
*Assistant Examiner*—Maria J Laios
(74) *Attorney, Agent, or Firm*—McDermott Will & Emery LLP (57) ABSTRACT

The present invention relates to a solid electrolyte including Li, O, P and a transition metal element. In the solid electrolyte, because the transition metal element T is reduced prior to phosphorus atoms, it is possible to prevent the valence of phosphorus atoms from decreasing. Thereby, the decomposition of the solid electrolyte resulting from the decrease of valence of phosphorus atoms is prevented, and therefore high ion conductivity is retained even in a wet atmosphere.

5 Claims, 2 Drawing Sheets

FOREIGN PATENT DOCUMENTS

| | | |
|---|---|---|
| JP | 2000-109360 A | 4/2000 |
| JP | 2000-200621 A | 7/2000 |
| JP | 2001-126758 A | 5/2001 |
| JP | 2002-42862 A | 2/2002 |
| JP | 2003-346896 A | 12/2003 |
| WO | WO 02/27824 A1 | 4/2002 |

SOLID ELECTROLYTE AND ALL SOLID STATE BATTERY CONTAINING SAME

RELATED APPLICATION

This application is a national phase of PCT/JP2004/005424 filed on Apr. 15, 2004, which claims priority from Japanese Application No. 2003-113850 filed on Apr. 18, 2003, the disclosures of which Applications are incorporated by reference herein. The benefit of the filing and priority dates of the International and Japanese Applications is respectfully requested.

TECHNICAL FIELD

The present invention relates to a solid electrolyte used in an all solid state battery, particularly in an all solid state lithium secondary battery, and to an all solid state battery containing the solid electrolyte.

BACKGROUND ART

With the development in portable devices such as personal computers and cell phones, demand is growing for batteries as power sources for such devices.

In batteries for such application, an electrolyte comprising a liquid such as organic solvent has been used as a medium for transferring ions. For this reason, there is a possibility that problems such as leakage of electrolyte from the battery might occur.

In order to solve the above problems, development is under way to produce an all solid state battery using, instead of a liquid electrolyte, a solid electrolyte. An all solid state lithium secondary battery, in particular, is vigorously being studied in many fields as a battery capable of providing a high energy density. This is because, for example, the use of Li metal in a negative electrode active material yields a high electromotive force since Li has a low atomic weight and the greatest ionization tendency, and therefore it is the most electrochemically base metal.

As the solid electrolyte used for the all solid state lithium secondary battery, for example, lithium halide, lithium nitride, lithium oxoacid salt and derivatives thereof are well known. Particularly, lithium phosphorus oxynitride ($Li_xPO_yN_z$, where x=2.8, 3z+2y=7.8) obtained by introducing nitrogen (N) into lithium orthophosphate ($Li_3PO_4$) is reported to have a very high lithium ion conductivity of $(1 \text{ to } 2) \times 10^{-6}$ S/cm although it is an oxide based material (see U.S. Pat. No. 5,597,660).

When the lithium phosphorus oxynitride is exposed to a wet atmosphere, however, phosphorus atoms (P) constituting lithium phosphorus oxynitride reacts with water molecules present in the wet atmosphere, during which the phosphorus atoms are reduced to a lower oxidation state from an oxidation state of +5. Thereby, lithium phosphorus oxynitride is decomposed, which significantly reduces the ion conductivity thereof.

When the ion conductivity is reduced as described above, internal impedance will increase in an all solid state battery using a solid electrolyte composed of lithium phosphorus oxynitride. For this reason, its charge/discharge rate characteristics will be significantly impaired.

Further, the decrease in ion conductivity in a wet atmosphere is also observed in lithium phosphate. Accordingly, such decrease in ion conductivity is the underlying problem in materials for solid electrolyte having lithium phosphate in the framework structure.

In view of the above, an object of the present invention is to provide a solid electrolyte capable of suppressing the decrease in ion conductivity even in a wet atmosphere, and an all solid state battery using the solid electrolyte.

DISCLOSURE OF INVENTION

The present invention relates to a solid electrolyte comprising Li, O, P and a transition metal element.

In the solid electrolyte, the transition metal element is preferably at least one selected from the group consisting of Ti, V, Cr, Mn, Fe, Co, Ni, Cu, Zr, Nb, Mo, Ru, Ag, Ta, W, Pt and Au.

The solid electrolyte preferably is a composition represented by the following formula:

$Li_xPT_yO_z$, where T represents a transition metal element, x=2 to 7, y=0.01 to 1, and z=3.5 to 8.

In the above formula, it is further preferred that x=2 to 3, y=0.01 to 0.5, and z=3.5 to 4.

In the above formula, it is further preferred that x=2 to 3, y=0.01 to 1, and z=3.505 to 7.

In the above formula, it is further preferred that x=2.01 to 7, y=0.01 to 1, and z=3.52 to 8.

The present invention further relates to an all solid state battery including a positive electrode, a negative electrode and the aforesaid solid electrolyte disposed between the positive electrode and the negative electrode.

BEST MODE FOR CARRYING OUT THE INVENTION

Hereinafter, a description will be given of a solid electrolyte of the present invention and an all solid state battery using the solid electrolyte.

The solid electrolyte of the present invention comprises lithium (Li), phosphorus (P), oxygen (O) and a transition metal element T. For example, the solid electrolyte can comprise lithium phosphate and a transition metal element T. In this case, the transition metal element T may be incorporated into lithium phosphate at atomic level. Alternatively, lithium phosphate and the transition metal element T may be mixed with each other at particle level. The solid electrolyte of the present invention may comprise, instead of the transition metal element T, either a transition metal oxide or lithium-containing transition metal oxide, and lithium phosphate.

As described above, the solid electrolyte of the present invention contains a transition metal element T. The transition metal element T has a higher reducing ability than a phosphorus atom, and therefore its valence can be easily varied. When a solid electrolyte containing such transition metal element T is exposed to a wet atmosphere, the transition metal element T is reduced prior to phosphorus atoms. Thereby, most of the phosphorus atoms are not reduced and thus maintain their original oxidation number, which prevents the decomposition of the solid electrolyte. Accordingly, the decrease in ion conductivity resulting from the decomposition of the electrolyte will also be prevented.

Further, it is preferred that, when the solid electrolyte is represented by the formula $Li_xPT_yO_z$, $x=2$ to 7, $y=0.01$ to 1, and $z=3.5$ to 8.

As described above, in the present invention, the reduction of phosphorus atoms is prevented by the addition of the transition metal element T. For this reason, the molar ratio y of the transition metal element T to phosphorus atoms in lithium phosphate constituting the solid electrolyte ((T mole number)/(P mole number)) is important. The molar ratio y is preferably 0.01 to 1 as mentioned above.

When the molar ratio y of the transition metal element T to phosphorus atoms is less than 0.01, the reduction of phosphorus atoms will not be sufficiently prevented.

Conversely, when a solid electrolyte having a molar ratio of the transition metal element to phosphorus atoms of exceeding 1 is allowed to contact with Li metal having a high reducing ability, an irreversible reaction might occur between the solid electrolyte and the Li metal. When an irreversible reaction occurs between the solid electrolyte and the Li metal, the Li metal will no longer exhibit a metal color. Further, in such solid electrolyte, the skeleton structure of lithium phosphate constituting the solid electrolyte will be damaged, reducing the ion conductivity of the solid electrolyte.

Moreover, when the solid electrolyte comprises a simple substance of transition metal element T and lithium phosphate, if the molar ratio y exceeds 0.5, the electron conductivity will be increased. The use of such solid electrolyte having an increased electron conductivity as a solid electrolyte of an all solid state battery might lead to self discharge of the solid electrolyte if the all solid state battery is in a charged state.

Further, other than any simple substance of transition metal element T, any transition metal oxide or any lithium-containing transition metal oxide may be used in the solid electrolyte. The composition of the solid electrolyte depends on the type of the simple substance of transition metal element T, transition metal oxide or lithium-containing transition metal oxide used, the mixing ratio thereof to lithium phosphate and the like. For this reason, it is preferred that x be 2 to 7 and z be 3.5 to 8.

A description will now be given of a method for producing the solid electrolyte of the present invention.

The solid electrolyte of the present invention can be produced using, for example, lithium phosphate and a simple substance of transition metal element T as the raw materials. Further, as mentioned above, instead of a simple substance of transition metal element T, a transition metal oxide or lithium-containing transition metal oxide may be used.

A typical example of the lithium phosphate for use is lithium orthophosphate ($Li_3PO_4$), and other lithium phosphate ($LiPO_3$) or a mixture of $Li_2O$ and $P_2O_5$ may be used.

A method for producing a solid electrolyte using lithium phosphate and either of a simple substance of transition metal element T, a transition metal oxide and a lithium-containing transition metal oxide will be described below.

(A) Solid Electrolyte Comprising Simple Substance of Transition Metal Element T and Lithium Phosphate The solid electrolyte of the present invention can be produced by various methods. For example, when a thin film of solid electrolyte is produced, a thin film production method performed in a vacuum can be used to produce it.

Examples of the thin film production method performed in a vacuum include sputtering method and vapor deposition method.

As the sputtering method, for example, there is a sputtering method in which a target is sputtered in an atmosphere of argon (Ar), atmosphere of oxygen ($O_2$) or mixed atmosphere of argon and oxygen by a means such as a magnetron or high-frequency generator (e.g. rf magnetron sputtering method).

Examples of the vapor deposition method include resistance heating deposition method in which vapor deposition is performed by heating a vapor deposition source with heat generated by the energization of a resistance; ion beam vapor deposition method in which vapor deposition is performed by irradiating an ion beam to a vapor deposition source; electron beam vapor deposition method in which vapor deposition is performed by heating a vapor deposition source by irradiating an electron beam to the vapor deposition source; and laser ablation method in which vapor deposition is performed by heating a vapor deposition source by irradiating a laser to the vapor deposition source.

When the solid electrolyte is produced using sputtering method, for example, as the target, both a lithium phosphate target and a transition metal element target can be used. Alternatively, a mixture prepared by mixing lithium phosphate with a simple substance of transition metal element T at a given mixing ratio can be used as the target.

When a thin film of solid electrolyte is produced using a vapor deposition method, both a lithium phosphate vapor deposition source and a transition metal element vapor deposition source can be used as the vapor deposition source. Alternatively, a mixture prepared by mixing lithium phosphate with a simple substance of transition metal element T at a given mixing ratio can be used as the vapor deposition source.

When a mixture of lithium phosphate and a simple substance of transition metal element T is used as the target or vapor deposition source, the mixing ratio should be appropriately adjusted according to a desired composition of solid electrolyte.

When the solid electrolyte is produced using a vapor deposition method, different vapor deposition methods can be used for lithium phosphate and the transition metal element T. That is, the vapor deposition of lithium phosphate may be done by resistance heating deposition method, and the vapor deposition of transition metal element T may be done by electron beam deposition method.

The transition metal element T used when producing the solid electrolyte is preferably at least one selected from the group consisting of titanium (Ti), vanadium (V), chromium (Cr), manganese (Mn), iron (Fe), cobalt (Co), nickel (Ni), copper (Cu), zirconium (Zr), niobium (Nb), molybdenum (Mo), ruthenium (Ru), silver (Ag), tantalum (Ta), tungsten (W), platinum (Pt) and gold (Au). It is needless to say that any transition metal element other than those listed above can be used as long as the effect of the present invention is not impaired.

In such solid electrolyte, Li atoms, phosphorus atoms and oxygen atoms have a valence of +1, +5 and −2, respectively. Because the transition metal element T is considered to be incorporated into lithium phosphate in the form of a metal, it is assumed that the transition metal element T has a valence of 0.

Further, when this solid electrolyte is represented by the formula $Li_\alpha PT_\beta O_\gamma$, it is preferred that $\alpha=2$ to 3, $\beta=0.01$ to 0.5, and $\gamma=3.5$ to 4.

(B) Solid Electrolyte Comprising Transition Metal Oxide and Lithium Phosphate

The solid electrolyte of the present invention can also be produced using a transition metal oxide and lithium phosphate. In this case also, the sputtering method and the vapor deposition method listed in the above (A) can be used.

The transition metal oxide for use is preferably at least one selected from the group consisting of titanium oxide ($TiO_2$), vanadium oxide ($V_2O_5$, $VO_2$), chromium oxide ($Cr_2O_3$), manganese oxide ($MnO_2$, $Mn_2O_3$), iron oxide ($Fe_2O_3$, $Fe_3O_4$), cobalt oxide ($CO_3O_4$, CoO), nickel oxide ($Ni_3O_4$, NiO), copper oxide (CuO), zirconium oxide ($ZrO_2$), niobium oxide ($Nb_2O_5$), molybdenum oxide ($MoO_2$, $MoO_3$), ruthenium oxide ($RuO_2$), silver oxide ($Ag_2O$, $Ag_2O_2$), tantalum oxide ($Ta_2O_5$), tungsten oxide ($WO_3$, $WO_2$), platinum oxide (PtO, $PtO_2$) and gold oxide ($Au_2O_3$). It is needless to say that any oxide other than those listed above can be used as long as the effect of the present invention is not impaired.

When this solid electrolyte is represented by the formula $Li_\alpha PT_\beta O_\gamma$, it is preferred that $\alpha=2$ to 3, $\beta=0.01$ to 1, and $\gamma=3.505$ to 7.

Further, the solid electrolyte comprising a transition metal oxide and lithium phosphate can be represented by the formula $Li_aPO_b$—$T_cO_d$. In this case, it is preferred that a=2 to 3, b=3.5 to 4, c=0.01 to 1, and d=0.005 to 3.

(C) Solid Electrolyte Comprising Lithium-Containing Transition Metal Oxide and Lithium Phosphate Further, the solid electrolyte of the present invention can also be produced using a lithium-containing transition metal oxide and lithium phosphate. When such solid electrolyte is represented by the formula $Li_\alpha PT_\beta O_\gamma$, it is preferred that $\alpha=2.01$ to 7, $\beta=0.01$ to 1, and $\gamma=3.52$ to 8.

Moreover, the solid electrolyte comprising a lithium-containing transition metal oxide and lithium phosphate can be represented by the formula $Li_aPO_b$—$Li_cT_dO_e$. In this case, it is preferred that a=2 to 3, b=3.5 to 4, c=0.01 to 4, d=0.01 to 1, and e=0.02 to 4.

The lithium-containing transition metal oxide is preferably at least one selected from the group consisting of lithium titanium oxide ($Li_4TiO_4$, $Li_2TiO_3$), lithium vanadium oxide ($Li_3VO_4$, $LiVO_3$), lithium chromium oxide ($Li_2CrO_4$), lithium manganese oxide ($LiMnO_4$, $Li_2MnO_2$, $LiMnO_2$), lithium iron oxide ($LiFeO_2$), lithium cobalt oxide ($LiCoO_2$), lithium nickel oxide ($LiNiO_2$), lithium copper oxide ($Li_2CuO_2$), lithium zirconium oxide ($Li_4ZrO_4$, $Li_2ZrO_3$), lithium niobium oxide ($Li_3NbO_4$, $LiNbO_3$), lithium molybdenum oxide ($Li_2MoO_4$), lithium tantalum oxide ($Li_3TaO_4$, $LiTaO_3$) and lithium tungsten oxide ($Li_2WO_4$). It is needless to say that any lithium-containing transition metal oxide other than those listed above can be used as long as the effect of the present invention is not impaired.

Figure 1:
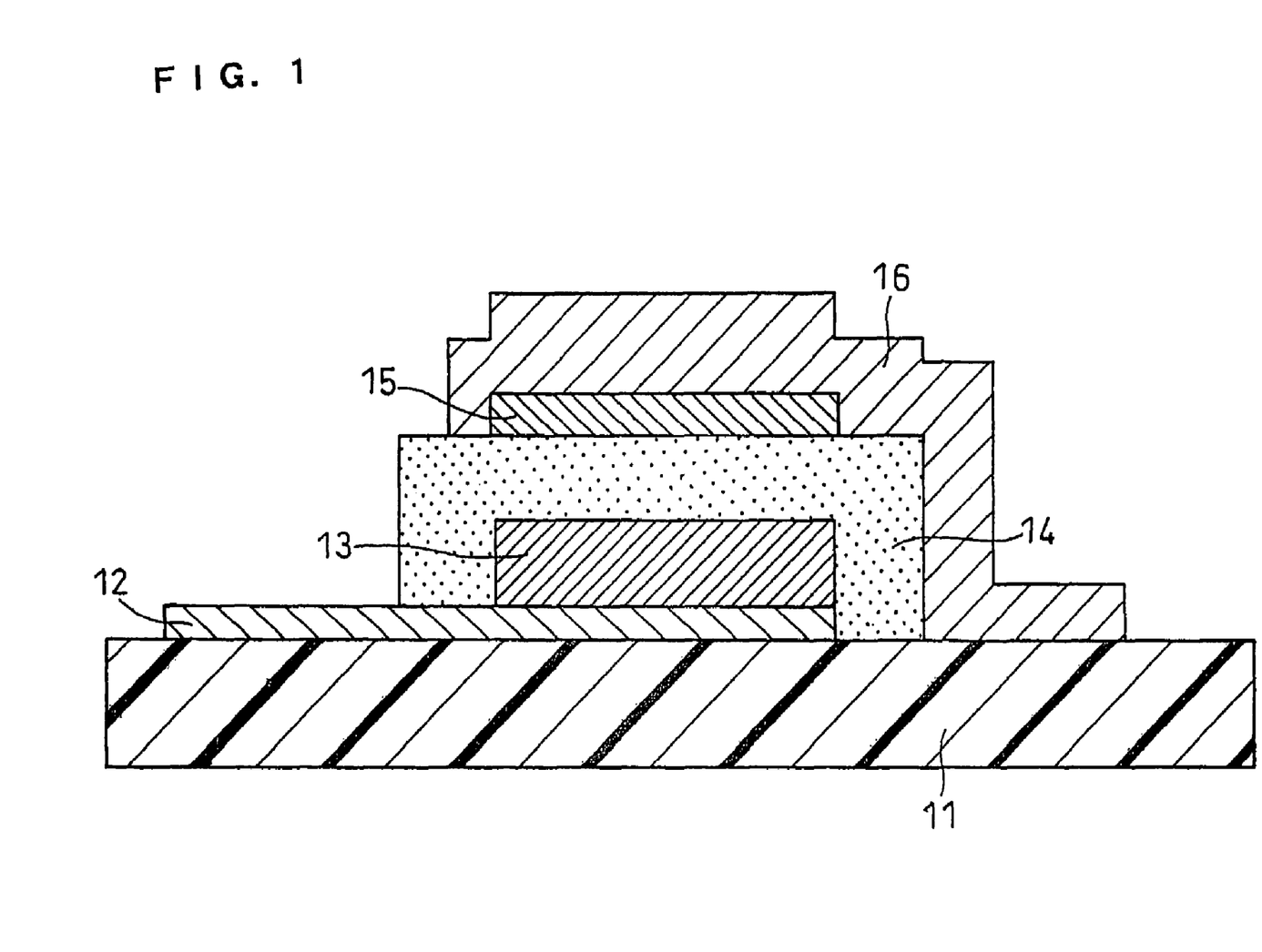
FIG. 1 is a schematic longitudinal sectional view of an all solid state battery having a solid electrolyte of the present invention.

Hereinafter, a description will be given of an all solid state battery containing the solid electrolyte of the present invention with reference to drawings. FIG. 1 is a schematic longitudinal sectional view of an all solid state lithium secondary battery containing the solid electrolyte of the present invention.

An all solid state lithium secondary battery shown in FIG. 1 includes a base plate 11, and a first current collector 12, a first electrode 13, a solid electrolyte 14, a second electrode 15 and a second current collector 16 which are laminated in this order on the base plate 11. In FIG. 1, the first electrode 13 serves as the positive electrode, and the second electrode 15 serves as the negative electrode. The entire first electrode 13 is completely covered with the solid electrolyte 14. The second electrode 15 is placed such that it faces the first electrode 13 with the solid electrolyte 14 therebetween. Further, the entire second electrode 15 is completely covered with the second current collector 16.

It should be noted that the first electrode 13 may serve as the negative electrode and the second electrode 15 may serve as the positive electrode.

As the base plate 11, there can be used an electrically insulating base plate of alumina, glass or polyimide film; a semiconductor base plate of silicon; or a conductive base plate of aluminum or copper. Because the base plate preferably has a low surface roughness, it is effective to use a base plate having a flat surface such as mirror-finished plate.

The first current collector 12 can be composed of an electron conductive material capable of being formed into a thin film. Examples of such material include platinum, platinum/palladium, gold, silver, aluminum, copper and ITO (indium-tin oxide film). Further, other than those listed above, any material having electron conductivity and unreactive with the first electrode can be used. However, when the base plate 11 is composed of a conductive material such as aluminum, copper or stainless steel, because the base plate 11 functions as a current collector, the first current collector 12 is unnecessary.

The first electrode 13 serving as the positive electrode can be composed of a positive electrode active material capable of being formed into a thin film. For example, in the case of an all solid state lithium secondary battery, it is preferred to use, as the positive electrode, lithium cobalt oxide ($LiCoO_2$), lithium nickel oxide ($LiNiO_2$), lithium manganese oxide ($LiMn_2O_4$), a transition metal oxide such as vanadium oxide ($V_2O_5$) or molybdenum oxide ($MoO_3$), or titanium sulfide ($TiS_2$).

The second electrode 15 serving as the negative electrode can be composed of a negative electrode active material capable of being formed into a thin film. For example, in the case of an all solid state lithium secondary battery, it is preferred to use, as the negative electrode, a carbon material such as graphite or hard carbon, silicon (Si), a silicon oxide (SiOx, where 0<x<2), a tin alloy, lithium cobalt nitride (LiCoN), Li metal or a lithium alloy (e.g., LiAl).

The second current collector 16 can be composed of an electron conductive material capable of being formed into a thin film. Examples of such material include platinum, platinum/palladium, gold, silver, aluminum, copper, ITO and carbon materials. Further, other than the materials listed above, any material having electron conductivity and unreactive with the solid electrolyte 14 and the second electrode 15 can also be used.

In the all solid state battery of FIG. 1, the solid electrolyte described above is used. The solid electrolyte of the present invention can retain high ion conductivity even in a wet atmosphere. For this reason, in an all solid state battery using the solid electrolyte, it is possible to prevent the battery performance, for example, charge/discharge rate characteristics, from decreasing even in a wet atmosphere. Further, when the solid electrolyte is used in an all solid state battery, the thickness thereof is preferably 0.1 to 10 μm.

Moreover, it is also possible to stack a plurality of such all solid state batteries to form a stacked battery.

Further, a resin or aluminum laminate film may be placed on the second current collector 16 to form a protection layer of the battery.

Although this embodiment has been described for the case where the solid electrolyte of the present invention composed of P, Li, O and a transition metal element T is used in an all solid state lithium secondary battery, the solid electrolyte of the present invention can be used in batteries other than an all solid state lithium secondary battery.

A description will now be given of a method for producing the all solid state battery shown in FIG. 1.

The all solid state battery shown in FIG. 1 can be produced by laminating, for example, on the base plate 11, the first current collector 12, the first electrode 13, the solid electrolyte 14, the second electrode 15 and the second current collector 16 in this order.

The production method will be specifically described below.

On the base plate 11 is formed the first current collector 12 with the use of the material as listed above by sputtering method or a vapor deposition method. As the sputtering method, for example, there is a sputtering method in which a target is sputtered in an atmosphere of argon, atmosphere of oxygen or mixed atmosphere of argon and oxygen by a means such as a magnetron or high-frequency generator (e.g. rf magnetron sputtering method). As the vapor deposition method, there are resistance heating deposition method, ion beam deposition method, electron beam deposition method and laser ablation method. Further, similar to the first current collector 12, the first electrode 13, the second electrode 15 and the second current collector 16 can be formed by the sputtering method or vapor deposition method.

Subsequently, on the first current collector 12 is formed the first electrode 13 serving as the positive electrode with the use of the positive electrode material as listed above.

The solid electrolyte 14 is then formed such that it covers the first electrode 13.

As described above, the solid electrolyte 14 is formed by the sputtering method or vapor deposition method using lithium phosphate and a simple substance of transition metal element T, transition metal oxide or lithium-containing transition metal oxide.

Subsequently, the second electrode 15 serving as the negative electrode is formed on the solid electrolyte 14 using the negative electrode material as listed above.

Finally, the second current collector 16 is formed using the material for current collector as listed above such that it covers the second electrode 15. Thereby, an all solid state battery is produced.

In order to produce an all solid state battery having certain size and shape, the first current collector 12, the first electrode 13, the solid electrolyte 14, the second electrode 15 and the second current collector 16 may be each produced using a mask having predetermined size and shape.

The above-described all solid state battery can also be produced by a method other than the thin film production method performed in a vacuum such as sputtering method or vapor deposition method.

Hereinafter, the present invention will be described using examples, but it should be understood that the present invention is not limited thereto.

EXAMPLE 1

Figure 2:
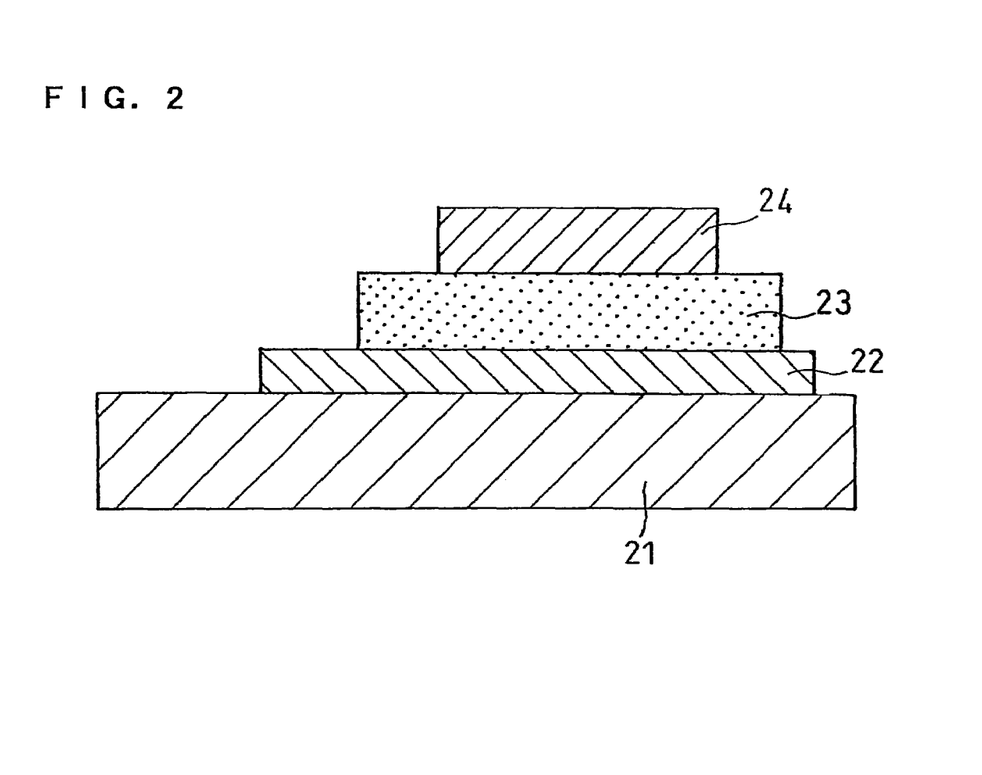
FIG. 2 is a schematic longitudinal sectional view of a test cell produced in Examples.

Test cells were produced by using different transition metal elements T to be contained in the solid electrolyte. The test cells each consisted of a silicon base plate 21, a platinum current collector layer 22, a solid electrolyte layer 23 and a platinum current collector layer 24 as shown in FIG. 2.

First, in the first step, a 0.5 μm thick platinum current collector layer 22 was formed at a predetermined position of a silicon base plate 21 by rf magnetron sputtering method using platinum as the target. The silicon base plate 21 used here had a surface having been oxidized and mirror-finished with a surface roughness of less than 30 nm. When forming the platinum current collector layer 22, a metal mask having an opening (20 mm×10 mm) was used.

In the second step, on the platinum current collector layer 22 was formed a 1.0 μm thick solid electrolyte layer 23 by performing rf magnetron sputtering for two hours. A metal mask having an opening with a dimension of 15 mm×15 mm was used here.

In the rf magnetron sputtering, orthophosphoric acid and the transition metal element T shown in Table 1 were used as the target. Argon was used as the sputtering gas. The internal pressure of the chamber in the device used was set to 2.7 Pa. The amount of the gas introduced was set to 10 sccm. The power of the high frequency irradiated to the lithium orthophosphate target was set to 200 W. The power of the high frequency irradiated to the transition metal element T target was controlled such that the molar ratio of the transition metal element T to phosphorus atoms would be 0.2. Accordingly, all the solid electrolytes had a composition of $Li_{2.8}PT_{0.2}O_{3.9}$.

In the third step, on the solid electrolyte layer 23 was formed a 0.5 μm thick platinum current collector layer 24 by rf magnetron sputtering method using platinum as the target such that the platinum current collector layer 24 would not spread beyond the solid electrolyte layer 23. Thereby, a test cell as shown in FIG. 2 was produced. When forming the platinum current collector layer, a metal mask having an opening with a dimension of 10 mm×10 mm was used.

The test cells produced in the above manner were referred to as cells 1 to 17, respectively. For comparison, another test cell containing a solid electrolyte without a transition metal element T was produced, which was referred to as comparative cell 1.

Subsequently, these cells were stored in a wet atmosphere for two weeks, after which the change in ion conductivity was observed for the test cells.

Immediately after the production, alternating current impedance was measured for each of the test cells.

The test cells were then stored in a thermostatic chamber with a relative humidity of 50% and a temperature of 20° C. for two weeks.

After storage for two weeks, alternating current impedance was measured for each of the test cells.

In the alternating current impedance measurement, the equilibrium voltage was set to zero, the amplitude of the applied voltage was set to ±10 mV, and the range of the frequency used was set to $10^5$ Hz to 0.1 Hz. Ion conductivity was determined from the result of the alternating current impedance measurement. The obtained results are shown in Table 1.

In Table 1, the ion conductivity of each of the cells after storage for two weeks is the rate thereof to the ion conductivity immediately after production of each of the test cells expressed in percentage.

TABLE 1

| | Transition metal element | Ion conductivity after storage for 2 weeks |
|---|---|---|
| Cell 1 | Ti | 73.61 |
| Cell 2 | V | 72.54 |
| Cell 3 | Cr | 75.00 |
| Cell 4 | Mn | 72.16 |
| Cell 5 | Fe | 73.13 |
| Cell 6 | Co | 76.50 |
| Cell 7 | Ni | 75.43 |
| Cell 8 | Cu | 76.19 |
| Cell 9 | Zr | 76.43 |

TABLE 1-continued

|  | Transition metal element | Ion conductivity after storage for 2 weeks |
|---|---|---|
| Cell 10 | Nb | 72.86 |
| Cell 11 | Mo | 77.11 |
| Cell 12 | Ru | 73.25 |
| Cell 13 | Ag | 73.06 |
| Cell 14 | Ta | 71.94 |
| Cell 15 | W | 78.60 |
| Cell 16 | Pt | 75.98 |
| Cell 17 | Au | 76.97 |
| Comp. cell 1 | — | 15.00 |

As shown in Table 1, in the solid electrolytes produced using the transition metal element T and lithium phosphate, any significant change in ion conductivity was not observed even after storage in the wet atmosphere for two weeks. In the conventional solid electrolyte without a transition metal element T, however, the ion conductivity decreased significantly due to storage in the wet atmosphere.

EXAMPLE 2

Test cells were produced in the same manner as in Example 1 except that tungsten (W) was used as the transition metal element T and that the molar ratio of W to phosphorus atoms was changed to those shown in Table 3. The obtained test cells were referred to as cells 18 to 25, respectively. For comparison, another test cell containing a solid electrolyte without tungsten was produced, which was referred to as comparative cell 2. The comparative cell 2 was the same as the comparative cell 1.

Ion conductivity was measured in the same manner as in Example 1 for each of the cells. The results are shown in Table 2.

Further, the rate of electron conductivity to ion conductivity for each of the cells was determined.

Immediately after the production, a voltage +1.0 V higher than the equilibrium voltage was applied to each cell, and the current value flowing after one hour was measured. Electron conductivity was then determined from the result obtained therefrom. The rate of the electron conductivity to the ion conductivity immediately after the production of each of the test cells is shown in Table 2 as electron conductivity/ion conductivity ratio.

TABLE 2

|  | Molar ratio (W/P) | Ion conductivity after storage for 2 weeks | Electron conductivity/ ion conductivity ratio |
|---|---|---|---|
| Comp. cell 2 | 0 | 15.00 | $5.58 \times 10^{-7}$ |
| Cell 18 | 0.005 | 29.30 | $5.81 \times 10^{-7}$ |
| Cell 19 | 0.01 | 73.83 | $6.21 \times 10^{-7}$ |
| Cell 20 | 0.05 | 75.93 | $6.11 \times 10^{-7}$ |
| Cell 21 | 0.1 | 76.04 | $6.22 \times 10^{-7}$ |
| Cell 22 | 0.2 | 78.60 | $8.19 \times 10^{-7}$ |
| Cell 23 | 0.5 | 75.35 | $8.31 \times 10^{-7}$ |
| Cell 24 | 0.52 | 73.36 | $2.95 \times 10^{-6}$ |
| Cell 25 | 0.6 | 69.05 | $4.76 \times 10^{-3}$ |

As shown in Table 2, when the molar ratio of tungsten to phosphorus was not less than 0.01, the ion conductivity did not change significantly even when the cell was stored in a wet atmosphere. However, when the molar ratio of tungsten to phosphorus was 0.005, the ion conductivity decreased significantly due to storage in the wet atmosphere.

Further, when the molar ratio of tungsten to phosphorus was 0.50, the electron conductivity ratio was very low. On the other hand, when the molar ratio of tungsten to phosphorus was greater than 0.50, the electron conductive ratio was high.

From these results, the molar ratio of the transition metal element to phosphorus atoms is preferably 0.01 to 0.5.

EXAMPLE 3

Test cells were produced in the same manner as in Example 1 except that, instead of a simple substance of transition metal element T, the transition metal oxides shown in Table 3 were used to form a solid electrolyte. The obtained test cells were referred to as cells 26 to 39, respectively. Table 3 shows the composition of the solid electrolyte for the cells 26 to 39.

For comparison, another test cell containing a solid electrolyte without a transition metal oxide was produced, which was referred to as comparative cell 3. The comparative cell 3 was the same as the comparative cell 1.

Ion conductivity was determined in the same manner as in Example 1 for each of the cells. The obtained results are shown in Table 3.

TABLE 3

|  | Transition metal oxide | Composition of solid electrolyte | Ion conductivity after storage for 2 weeks |
|---|---|---|---|
| Cell 26 | $TiO_2$ | $Li_{2.8}PTi_{0.2}O_{4.3}$ | 76.39 |
| Cell 27 | $V_2O_5$ | $Li_{2.8}PV_{0.2}O_{4.4}$ | 73.94 |
| Cell 28 | $Cr_2O_3$ | $Li_{2.8}PCr_{0.2}O_{4.2}$ | 76.61 |
| Cell 29 | $MnO_2$ | $Li_{2.8}PMn_{0.2}O_{4.3}$ | 72.73 |
| Cell 30 | $Fe_3O_4$ | $Li_{2.8}PFe_{0.2}O_{4.17}$ | 74.38 |
| Cell 31 | $Co_3O_4$ | $Li_{2.8}PCo_{0.2}O_{4.17}$ | 77.60 |
| Cell 32 | NiO | $Li_{2.8}PNi_{0.2}O_{4.1}$ | 76.57 |
| Cell 33 | CuO | $Li_{2.8}PCu_{0.2}O_{4.1}$ | 77.25 |
| Cell 34 | $ZrO_2$ | $Li_{2.8}PZr_{0.2}O_{4.3}$ | 78.34 |
| Cell 35 | $Nb_2O_5$ | $Li_{2.8}PNb_{0.2}O_{4.4}$ | 75.00 |
| Cell 36 | $MoO_3$ | $Li_{2.8}PMo_{0.2}O_{4.5}$ | 78.61 |
| Cell 37 | $Ag_2O$ | $Li_{2.8}PAg_{0.2}O_{4.0}$ | 74.09 |
| Cell 38 | $Ta_2O_5$ | $Li_{2.8}PTa_{0.2}O_{4.4}$ | 75.54 |
| Cell 39 | $WO_3$ | $Li_{2.8}PW_{0.2}O_{4.5}$ | 80.47 |
| Comp. cell 3 | — | $Li_3PO_4$ | 15.00 |

As shown in Table 3, in the cells 26 to 39, the ion conductivity did not change significantly even after storage in the wet atmosphere for two weeks. On the other hand, in the comparative cell 3 using a conventional solid electrolyte without a transition metal element, the ion conductivity decreased significantly due to storage in the wet atmosphere.

EXAMPLE 4

Test cells were produced in the same manner as in Example 1 except that, instead of a simple substance of transition metal element T, the lithium-containing transition metal oxides shown in Table 4 were used to form a solid electrolyte. The thus-obtained test cells were referred to as cells 40 to 48, respectively. Table 4 shows the composition of the solid electrolyte for the cells 40 to 48.

For comparison, another test cell containing a solid electrolyte without a lithium-containing transition metal oxide was produced, which was referred to as comparative cell 4. The comparative cell 4 was the same as the comparative cell 1.

Ion conductivity was measured in the same manner as in Example 1 for each of the cells. The obtained results are shown in Table 4.

TABLE 4

| | Lithium-containing transition metal oxide | Composition of solid electrolyte | Ion conductivity after storage for 2 weeks |
|---|---|---|---|
| Cell 40 | $Li_4TiO_4$ | $Li_{4.0}PTi_{0.25}O_{5.0}$ | 75.69 |
| Cell 41 | $Li_3VO_4$ | $Li_{3.75}PV_{0.25}O_{5.0}$ | 73.24 |
| Cell 42 | $Li_2CrO_4$ | $Li_{3.5}PCr_{0.25}O_{5.0}$ | 75.40 |
| Cell 43 | $LiMnO_4$ | $Li_{3.25}PMn_{0.25}O_{5.0}$ | 71.59 |
| Cell 44 | $Li_4ZrO_4$ | $Li_{4.0}PZr_{0.25}O_{5.0}$ | 77.71 |
| Cell 45 | $Li_3NbO_4$ | $Li_{3.75}PNb_{0.25}O_{5.0}$ | 74.64 |
| Cell 46 | $Li_2MoO_4$ | $Li_{3.5}PMo_{0.25}O_{5.0}$ | 79.60 |
| Cell 47 | $Li_3TaO_4$ | $Li_{3.75}PTa_{0.25}O_{5.0}$ | 74.82 |
| Cell 48 | $Li_2WO_4$ | $Li_{3.5}PW_{0.25}O_{5.0}$ | 79.77 |
| Comp. cell 4 | — | $Li_3PO_4$ | 15.00 |

As shown in Table 4, in the solid electrolytes of the present invention, the ion conductivity did not change significantly even after storage in the wet atmosphere for two weeks. However, in the conventional solid electrolyte composed of lithium phosphate without a transition metal element, the ion conductivity decreased significantly due to storage in the wet atmosphere.

EXAMPLE 5

Test cells were produced in the same manner as in Example 1 except that, instead of a simple substance of transition metal element T, a lithium-containing transition metal oxide, namely, lithium tungsten oxide ($Li_2WO_4$) was used to form a solid electrolyte, and that the molar ratio of tungsten to phosphorous atoms (P) was changed to those shown in Table 5. The thus-obtained test cells were referred to as cells 49 to 54, respectively. Note that the cell 51 was the same as the cell 48 of Example 4.

Ion conductivity was measured in the same manner as in Example 1 for each of the cells. The obtained results are shown in Table 5.

TABLE 5

| | Composition of solid electrolyte | Ion conductivity after storage for 2 weeks |
|---|---|---|
| Cell 49 | $Li_{3.02}PW_{0.01}O_{4.04}$ | 80.09 |
| Cell 50 | $Li_{3.2}PW_{0.1}O_{4.4}$ | 73.27 |
| Cell 51 | $Li_{3.5}PW_{0.25}O_{5.0}$ | 79.77 |
| Cell 52 | $Li_{3.66}PW_{0.33}O_{5.32}$ | 78.60 |
| Cell 53 | $Li_{5.0}PW O_{8.0}$ | 77.10 |
| Cell 54 | $Li_{7.0}PW_{2.0}O_{12.0}$ | 76.19 |

As shown in Table 5, the ion conductivity did not change significantly even after storage in the wet atmosphere for two weeks.

EXAMPLE 6

Figure 3:
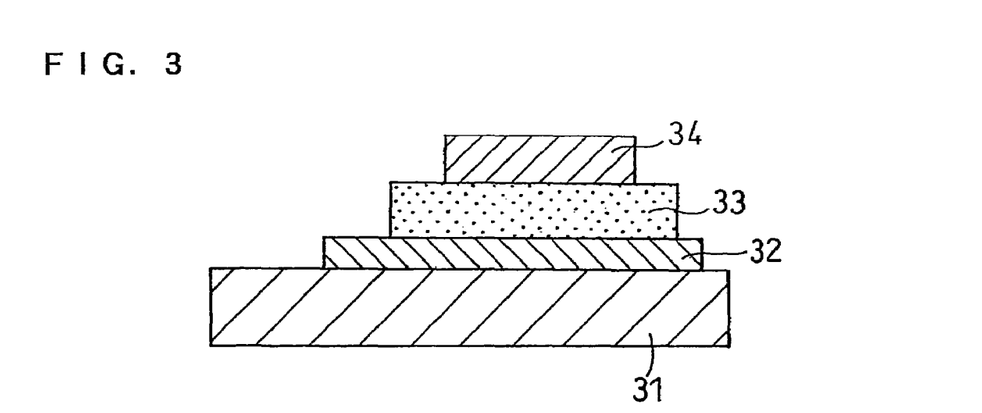
FIG. 3 is a schematic longitudinal sectional view of 1 a test cell in which, instead of a current collector, Li metal layer is formed on a solid electrolyte.

In order to check the reactivity between the solid electrolyte represented by the composition shown in Table 5 and Li metal, test cells as shown in FIG. 3 were produced. The test cells each consisted of a silicon base plate 31, a platinum current collector layer 32, a solid electrolyte layer 33 and a lithium metal layer 34.

The test cells were produced in the same manner as in Example 5 except that, instead of the platinum current collector layer 24 of the test cell shown in FIG. 2, Li metal layer 34 was formed by resistance heating deposition method. The thus-obtained test cells were referred to as cells 55 to 60, respectively.

The obtained cells were stored in a thermostatic chamber with a temperature of 20° C. placed in a room in dry air environment with a dew point temperature of −40° C. for two weeks. After the storage, the Li metal layer of each cell was visually checked to evaluate the condition of the Li metal layer. Table 6 shows the results.

TABLE 6

| | Lithium layer after storage for 2 weeks |
|---|---|
| Cell 55 | ○ |
| Cell 56 | ○ |
| Cell 57 | ○ |
| Cell 58 | ○ |
| Cell 59 | ○ |
| Cell 60 | X |

○: stably present (having a metal color)
X: turned into black

As shown in Table 6, in the cell 60, the solid electrolyte reacted with Li metal, and thus the Li metal layer turned into black. On the other hand, in the cells 55 to 59, the Li metal layer was stably present even after storage in the dry air environment for two weeks. This result illustrates that, when the molar ratio of tungsten to phosphorous atoms is 0.01 to 1, the solid electrolyte does not react with Li metal.

The foregoing indicates that the molar ratio of the transition metal element T to phosphorus atoms is preferably 0.01 to 1.

EXAMPLE 7

An all solid state battery containing a solid electrolyte comprising lithium phosphate and a transition metal element was produced.

In this example, an all solid state battery as shown in FIG. 1 was produced.

Here, the first electrode served as the positive electrode, and the second electrode served as the negative electrode.

First, in the first step, on a silicon base plate 11 was formed a first current collector layer 12 composed of platinum by rf magnetron sputtering method. The silicon base plate 11 used here had a surface having been oxidized and mirror-finished with a surface roughness of less than 30 nm. When forming the platinum current collector layer 12, a metal mask having an opening (20 mm×12 mm) was used. The platinum current collector layer 12 had a thickness of 0.5 μm.

In the second step, rf magnetron sputtering using lithium cobalt oxide ($LiCoO_2$) as the target was performed for two hours. Thereby, on the platinum current collector layer 12 was formed a first electrode layer 13 composed of lithium cobalt oxide serving as the positive electrode. At this time, a metal mask having an opening with a dimension of 10 mm×10 mm was used. The first electrode layer 13 had a thickness of 1 μm.

In the rf magnetron sputtering, the internal pressure of the chamber in the device was set to 2.7 Pa. A mixed gas of argon and oxygen was used as the sputtering gas. The amounts of argon and oxygen introduced were set to 7.5 sccm and 2.5 sccm, respectively. The power of the high frequency irradiated to the lithium cobalt oxide target was set to 200 W.

In the third step, a 1 μm thick solid electrolyte layer 14 was produced on the first electrode layer 13 by performing rf magnetron sputtering for two hours. At this time, a metal mask having an opening with a dimension of 15 mm×15 mm was used.

As the target in this rf magnetron sputtering, two different targets, namely, lithium orthophosphate and tungsten (W) were used. Argon (Ar) was used as the sputtering gas.

In the rf magnetron sputtering, the internal pressure of the chamber in the device was set to 2.7 Pa. The amount of gas introduced was set to 10 sccm. The power of the high frequency irradiated to the lithium orthophosphate target was set to 200 W. Additionally, the power of the high frequency irradiated to the tungsten target was controlled such that the molar ratio of tungsten to phosphorus atoms would be 0.2.

In the fourth step, on the solid electrolyte layer 14 was formed a second electrode layer 15 serving as the negative electrode by resistance heating deposition method. At this time, a metal mask having an opening with a dimension of 10 mm×10 mm was used. The second electrode layer 15 had a thickness of 0.5 µm.

Finally, in the fifth step, a 1.0 µm thick second current collector layer 16 was formed by rf magnetron sputtering method such that it would completely cover the second electrode layer 15. Thereby, a test battery was produced. When forming the second current collector layer 16, a metal mask having an opening with a dimension of 20 mm×12 mm was used. Further, the second current collector layer 16 was formed such that it would not be in contact with the first current collector layer 12. The test battery thus obtained was referred to as battery 1.

For comparison, another test battery containing a solid electrolyte composed of only lithium phosphate was produced, which was referred to as comparative battery 1.

The obtained battery 1 and comparative battery 1 were evaluated in terms of moisture resistance.

First, these batteries were stored in a thermostatic chamber with a relative humidity of 50% and a temperature of 20° C. for two weeks. Alternating current impedance was then measured for each of the battery 1 and the comparative battery 1.

In the alternating current impedance measurement, the equilibrium voltage was set to zero, the amplitude of the applied voltage was set to ±10 mV, and the range of the frequency used was set to $10^5$ Hz to 0.1 Hz.

From the result of the alternating current impedance measurement, the internal impedance of each of these batteries was determined. Table 7 shows the obtained internal impedance values. In Table 7, the internal impedance of each of the batteries after storage for two weeks is the rate thereof to the internal impedance immediately after production of each of the batteries expressed in percentage.

TABLE 7

|  | Internal impedance after storage for 2 weeks |
| --- | --- |
| Battery 1 | 127 |
| Comparative battery 1 | 667 |

As shown in Table 7, in the test battery using the solid electrolyte of the present invention, the internal impedance did not change significantly even after storage in the wet atmosphere for two weeks. However, in the comparative battery 1 using a conventional solid electrolyte without a transition metal element, the internal impedance was high. Presumably, this is because the solid electrolyte degraded due to storage in the wet atmosphere.

EXAMPLE 8

Test batteries were produced in the same manner as in Example 7 except that a lithium-containing transition metal oxide, namely, lithium tungsten oxide ($Li_2WO_4$) was used to form a solid electrolyte, and that the composition of the solid electrolyte was changed to $Li_{3.2}PW_{0.1}O_{4.4}$, $Li_{3.5}PW_{0.25}O_{5.0}$ or $Li_{3.66}PW_{0.33}O_{5.32}$. The thus-obtained test batteries were referred to as batteries 2 to 4, respectively.

Internal impedance after storage in a wet atmosphere for two weeks was measured in the same manner as in Example 7 for each of the batteries 2 to 4. The obtained results are shown in Table 8.

TABLE 8

|  | Internal impedance after storage for 2 weeks |
| --- | --- |
| Battery 2 | 125 |
| Battery 3 | 125 |
| Battery 4 | 127 |

As shown in Table 8, in the batteries 2 to 4, the internal impedance did not change significantly even after storage in the wet atmosphere for two weeks.

From the foregoing, it is clear that an all solid battery using the solid electrolyte of the present invention can prevent its electrochemical characteristics, for example, charge/discharge rate characteristics, from decreasing even when it is in a wet atmosphere.

INDUSTRIAL APPLICABILITY

According to the present invention, it is possible to provide a solid electrolyte having high ion conductivity even when it is used in a wet atmosphere. The solid electrolyte can be used as a solid electrolyte for an all solid state battery.

The invention claimed is:

1. A solid electrolyte comprising Li, O, P and a transition metal element, wherein said solid electrolyte is represented by the following formula:

$Li_xPT_yO_z$, where T is at least one selected from the group consisting of Ti, V, Cr, Mn, Fe, Co, Ni, Cu, Zr, Nb, Mo, Ru, Ag, Ta, W, Pt and Au, x=2 to 7, y=0.01 to 1, and z=3.5 to 8.

2. The solid electrolyte in accordance with claim 1, wherein,
in said formula, x=2 to 3, y=0.01 to 0.5, and z=3.5 to 4.

3. The solid electrolyte in accordance with claim 1, wherein,
in said formula, x=2 to 3, y=0.01 to 1, and z=3.505 to 7.

4. The solid electrolyte in accordance with claim 1, wherein,
in said formula, x=2.01 to 7, y=0.01 to 1, and z=3.52 to 8.

5. An all solid state battery comprising a positive electrode, a negative electrode and the solid electrolyte in accordance with claim 1 disposed between said positive electrode and said negative electrode.

* * * * *